United States Patent
Batheja et al.

[11] Patent Number: 5,276,719
[45] Date of Patent: Jan. 4, 1994

[54] HYDRAULIC CONTROL ROD DRIVE FOR A NUCLEAR REACTOR

[75] Inventors: Pramod Batheja, Erlangen; Werner Meier, Kunreuth; Peter Rau, Leutenbach, all of Fed. Rep. of Germany

[73] Assignee: Siemens Aktiengesellschaft, Munich, Fed. Rep. of Germany

[21] Appl. No.: 929,980

[22] Filed: Aug. 14, 1992

[30] Foreign Application Priority Data

Aug. 14, 1991 [DE] Fed. Rep. of Germany ....... 4126972

[51] Int. Cl.$^5$ ............................................... G21C 7/06
[52] U.S. Cl. ...................................... 376/230; 376/225
[58] Field of Search ............... 376/234, 230, 232, 225; 976/DIG.

[56] References Cited

U.S. PATENT DOCUMENTS

| | | | |
|---|---|---|---|
| 3,775,247 | 11/1973 | Ode et al. | 376/230 |
| 3,941,653 | 3/1976 | Thorp, II | 376/235 |
| 4,035,230 | 7/1977 | Bevilacqua | 376/225 |
| 4,826,648 | 5/1989 | Savary | 376/225 |
| 4,826,649 | 5/1989 | Batheja et al. | 376/230 |
| 4,961,897 | 10/1990 | Chevereau | 376/234 |

FOREIGN PATENT DOCUMENTS 1178526 9/1964 Fed. Rep. of Germany.
2129392 12/1971 Fed. Rep. of Germany.

Primary Examiner—Daniel D. Wasil
Assistant Examiner—Meena Chelliah
Attorney, Agent, or Firm—Herbertt L. Lerner; Laurence A. Greenberg

[57] ABSTRACT

A hydraulic control rod drive for a nuclear reactor, with a a reactor plenum enclosing the drive, comprises first and second hollow bodies together forming a cylinder and a hollow piston. Working fluid is supplied through one of the hollow bodies. The first hollow body is stationary and the second hollow body is disposed coaxially around the first hollow body. The two hollow bodies define an annular gap therebetween so as to allow axial reciprocating movement of the second hollow body, which forms a carrier body for control elements of the control rod. The second hollow body can be lifted, lowered or suspended by feeding working fluid. A portion of the fluid is removed from the inner space via a throttle passage. A positional measurement system determines the relative displacement of the second hollow body by measuring an ultrasonic measurement path. The system includes an ultrasound reflector and an ultrasonic transducer rigidly mounted remote from the ultrasound reflector. Provisions are made for venting the inner space through venting channels which open into the reactor plenum at a security distance from the measurement path so as not to adversely affect the ultrasonic measurement.

11 Claims, 4 Drawing Sheets

HYDRAULIC CONTROL ROD DRIVE FOR A NUCLEAR REACTOR

BACKGROUND OF THE INVENTION
Field of the Invention

The invention relates to a hydraulic control rod drive for a nuclear reactor, in particular for a heating reactor, with a piston/cylinder drive for a respective control rod and a reactor plenum enclosing the drive.

Heating reactors are designed for a relatively low primary pressure of, for instance, 15 bar; the primary medium or working fluid circulates in the reactor pressure vessel by the natural circulation principle. The fuel element bundle of such a heating reactor and the flow box are preferably embodied mechanically separate from one another, whereby the flow box is as long as dictated by the stack height necessary for natural circulation. Four fuel element bundles respectively are combined within such a box, the core box, including the associated control rod with drive. The control rods are moved within cross-like guides, which are disposed in the box of the reactor core. The integration of the control rod drives in the primary system necessitates a drive system which is compatible with the primary coolant, i.e. with water. The low nuclear power density due to the natural circulation principle and the corresponding control requirements make it possible to use a hydraulic drive which is operated with primary water as the working fluid. The fuel element bundle and the actual control rod are thereby preferably embodied as they are known from boiling water reactors. In general, a heating reactor has characteristics of a boiling water reactor as well as of a pressurized water reactor.

A hydraulic control rod drive for a nuclear reactor is known from German Published, Non-Prosecuted application 34 30 929, entitled "Boiling Water Reactor Control Rod Drive Using Coolant as Hydraulic Fluid With Ultrasonic Locating Probe for Rod Position". In that device, the position of the control rods is determined by way of an ultrasonic measurement device with a supersonic transducer, which serves as an ultrasonic sender and receiver. The transducer is disposed in a linear channel between the control rod drive and the upper fill level of the reactor coolant.

The invention starts out with the appreciation that gas bubbles in the drive system can under certain circumstances lead to oscillations of the control element and thus to undesireable reactivity fluctuations. The above-mentioned prior art teaching does not provide for venting any gas bubbles from the drive system.

Regarding a venting opening provided in the context of this invention, working fluid leaks through the opening which corresponds approximately to the core inlet temperature. Due to heat conduction and heating by gamma radiation absorption, the working medium temperature in the guide shaft of the associated fuel element may be up to about 30° C. above the temperature of the partial fluid currents through the venting opening. Accordingly, eddies with varying water density can form in the opening region of the venting openings, which eddies impair the ultrasonic distance measurement.

It is accordingly an object of the invention to provide a hydraulic control rod drive for a nuclear reactor, and particularly for a heating reactor, which overcomes the hereinafore-mentioned disadvantages of the heretofore-known devices of this general type and taking the aforementioned dangers into account. The invention is based on the object to improve the control rod drive of the above-mentioned kind in its operational functionality in a sense that, on the one hand, the piston-cylinder drive is effectively vented of gas bubbles and that, on the other hand, the partial fluid flows exiting from the venting opening cannot impair the ultrasonic distance measurement.

With the foregoing and other objects in view there is provided, in accordance with the invention, in a nulcear reactor having a fuel assembly with a control rod and a reactor plenum enclosing the fuel assembly, a hydraulic control rod drive, comprising a movable cylinder having control rod elements disposed thereon; a stationary piston rigidly mounted in the fuel assembly, the piston having a bottom, an open top, and an axial opening formed therein for allowing communication between the bottom and the open top; the cylinder being disposed coaxially around the piston and defining a gap therebetween so as to allow axial movement of the cylinder; means for supplying a working fluid to the piston for lifting, lowering or suspending the cylinder; means for measuring a vertical displacement of the cylinder; and means for venting the gap between the piston and the cylinder.

In accordance with another feature of the invention, the control rod drive measuring means include an ultrasonic reflector disposed on the cylinder, and an ultrasonic transducer rigidly mounted above the cylinder in alignment with a longitudinal axis of the cylinder.

In accordance with again another feature of the invention, the venting means are in the form of a venting channel formed in an upper end of the cylinder for allowing working fluid with gas bubbles to escape from the cylinder.

The invention is embodied in a hydraulic control rod drive for a nuclear reactor, in particular a heating reactor, of the above-mentioned structure, which provides the following further features, in accordance with the invention, for solving the object as presented:

a) besides a cylinder, a piston is also formed as a hollow body, b) a first one of the two hollow bodies is stationary and serves to supply the working fluid, c) the second one of the two hollow bodies is coaxially mounted around the first hollow body with an annular gap in between and is movable upward and downward and forms a carrier body for control elements of the control rod, d) the working fluid can be supplied into the two hollow bodies via a supply channel in the lower region of the first hollow body for mass flow-dependent lifting, lowering or suspending the second hollow body and can be removed from the inner space of the two hollow bodies via a throttle passage, preferably an annular gap, e) an ultrasound reflector is attached at the upper, head end of the second hollow body, which reflector forms a positional measurement system with an ultrasonic measurement path together with an ultrasonic transducer rigidly mounted above and remote from the second hollow body, f) the second hollow body has a venting channel configuration in the region of its upper end for venting the second hollow body, which configuration opens into the reactor plenum at a security distance a1, a2 from the ultrasonic measurement path which is great enough such that the ultrasonic measurement remains virtually unaffected by density fluctuations in the working fluid.

The advantages attained with the invention are mainly seen in the fact that, on the one hand, an effective venting of the inner space of the control element, or hollow cylinder/hollow piston is provided and, on the other hand, the partial venting currents associated with this venting can have no or virtually no disadvantageous effect on the ultrasonic distance measurement of the control element.

In a preferred embodiment of the invention the first of the two hollow bodies is preferably a hollow piston open on the top and, correspondingly, the second hollow body is a hollow cylinder, which covers the hollow piston coaxially and with an annular gap, whereby the axial position of the hollow cylinder relative to the hollow piston can be determined by the amount of working fluid supplied through the hollow piston into the interior of the hollow cylinder.

According to an advantageous further development of the invention and in the case when the control elements are embodied as cross-shaped absorber plates, a cross-shaped attachment part for forming the venting channel configuration is attached at the head end of the hollow cylinder. Radial channels of the venting configuration originate from a central channel part communicating with the hollow cylinder interior, extend through the cross legs of the attachment part, and open into the reactor plenum approximately in the region of the absorber plate tips.

According to another advantageous embodiment of the hydraulic drive, whereby cross-shaped absorber plates are likewise assumed, there is provided for the venting channel configuration to be formed by a head plate whose diameter corresponds approximately to that of the hollow cylinder and which has a venting channel configuration disposed therein which is approximately T-shaped in axial section. The outlet pipes with outlet openings are inserted into the channels and the outlet openings are disposed at a security distance from the ultrasonic measurement path.

When the pressure of the hydraulic working fluid within the piston/cylinder drive relative to the reactor plenum is not more than about 1.5 bar, it is suggested that the channels of the venting channel configuration opening into the reactor plenum extend at a slight rise of, for instance, 5° to 10° with the horizontal.

In accordance with a concomitant feature of the invention, the control rod drive is embodied such that the first hollow body on its outer circumference and the second hollow body on its inner periphery are provided with first annular protrusions and recesses and with cooperating second annular recesses and protrusions, wherein an annular gap is defined between the first protrusions and recesses and the second recesses and protrusions. The annular gap forms a throttle passage for the working fluid from the inner space of the two hollow bodies into the reactor plenum.

Other features which are considered as characteristic for the invention are set forth in the appended claims.

Although the invention is illustrated and described herein as embodied in a hydraulic control rod drive for a nuclear reactor, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

The three drive versions A1 to A3 illustrated in the FIGS. 1 to 7 belong to hydraulic drives for control rods in a nuclear reactor, particularly in a heating reactor.

Figure 1:
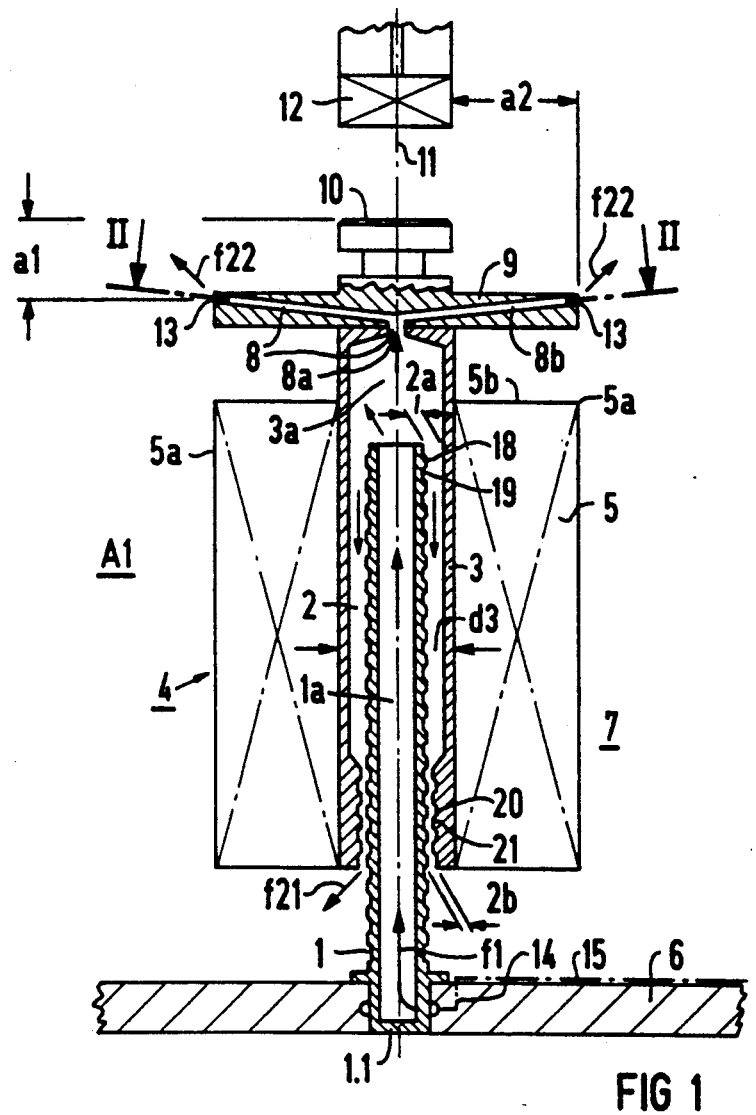
FIG. 1 is a side-elevational, partly cross-sectional view of a first embodiment of the invention with a cross-shaped attachment section.
Figure 2:
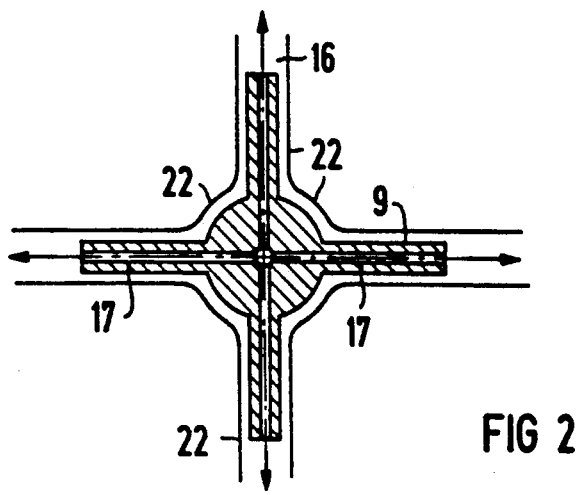
FIG. 2 is a top-plan view of a cross section at the plane II—II in FIG. 1, i.e. two partial cross sections extend obliquely, so as to section along the venting channels.

Referring now to the figures of the drawing in detail and first, particularly, to FIGS. 1 and 2 thereof, there is seen an upwardly and downwardly movable hollow cylinder 3 as a part of a control rod 4 which is coaxially disposed relative to a stationary hollow piston 1 defining an annular gap 2 therebetween. The hollow cylinder 3 forms a carrier tube for the control elements 5, here embodied as so-called absorber blades. The hollow cylinder 3 serves as a drive cylinder for the control rod 4 and it cooperates with the hollow piston 1 for that purpose. The working fluid (the coolant of the nuclear reactor), i.e. chemically processed (deionized) water, is supplied to the lower end 1.1 of the hollow piston 1 which is mounted in a lower core carrier plate 6, for lifting, lowering or holding the hollow cylinder 3. The working fluid flows into the reactor plenum 7 at the lower (narrower) end 2b of the annular gap 2. The flow arrows f21 indicate that flow.

A venting channel configuration 8 is provided at the top region of the hollow cylinder 3 which is a throttling venting opening for the working medium. From the venting configuration partial venting flows according to arrows f22 exit into the reactor plenum 7. These partial flow currents may carry gas bubbles. The channel configuration 8 will be dealt with in more detail in the following.

A cylindrical disk-shaped ultrasound reflector 10 is placed on an attachment or adaptor part 9 which is cross-shaped in a top plan view and which is hat or plate-shaped as seen in elevation; the outer diameter of the ultrasound reflector 10 corresponds approximately to that of the hollow cylinder 3. The reflector 10, together with an ultrasonic transducer 12, which is rigidly mounted above the control rod 4 in alignment with the longitudinal axis 11, forms a position measuring system for the control rod 4. The distance of the reflector 10 and thus the control rod location are determined by sending ultrasonic signals with the transducer 12 in the direction of the reflector 10 and by receiving the signals after they have been reflected. As mentioned, a venting cross section through the channel configuration 8 is provided which serves to distribute the partial venting flow f22 of the working fluid onto outlet locations 13, located below the reflector 10 at a greater axial distance a1 and at a greater radial distance a2 with respect to the reflector (or its outer circumference). In the illustrated hydraulic drive A1 with cross-shaped absorber plates 5 (control elements) and with corresponding cross-shaped gaps 16 within the core cell formed of four fuel elements, a cross-shaped adapter part 9 is provided which is mounted at the upper end of the hollow cylinder and whose radial channels emanating from a central channel part 8a and disposed in cross legs or extensions 17 exit into the reactor plenum 7 approximately in the region of the absorber plate tips 5a.

The core carrier plate 6 has internal hydraulic channels 14 and external hydraulic lines 15 for supplying working fluid into the lower end 1.1 of the hollow piston 1 which is closed at that lower end. As indicated by an arrow f1, the working fluid flows from here upwardly through an interior or inner space 1a of the hollow piston 1 and, depending on the mass flow, causes a pressure which is less or greater than that in the surrounding reactor plenum 7. The control rod 4 with the hollow cylinder 3 is thus either held in its current position (when the mass flow remains constant), the control rod 4 is lowered by one or several steps (when the mass flow is reduced), or it is lifted up by one or several steps (when the mass flow increases). Changes in position take place until a new hydraulic equilibrium is reached in the lifted or lowered position.

For the purpose of achieving a defined hydraulic throttling and for stabilizing a respective control rod position, the hollow piston 1 is provided with annular protrusions 18 and recesses 19 on its outer circumference, and the hollow cylinder 3 is provided with corresponding annular recesses 20 and protrusions 21 on its inner periphery.

The control rod drive is fully integrated in the reactor pressure vessel; no conduct of movable parts through the wall of the reactor pressure vessel is necessary. The hydraulic control is provided such that for the case of an immediate shut-down, all control rods (only the control rod 4 is illustrated) fall to the lower position in the core under their own weight. This can be the position shown in FIG. 1. The control rod may in its lower position, however, be yet slightly closer to the lower core carrier plate 6.

The absorber plates 5 are preferably filled with boron carbide. They move in their own (non-illustrated) guides within the gaps 16 (FIG. 2). The length of the control rod guides is chosen such that guiding of the control rods 4 is still ensured when they are fully driven out of the core (see position of FIG. 5). The fuel elements 22 which are indicated only by their contours (FIG. 2) form the control rod guide with the gaps of the four-fold core cell configuration; the control rod guide extends from the core carrier plate 6 upward, whereby about half of the axial length is occupied by the fuel elements 6 and the axial length above that is provided with a (non-illustrated) sheet-metal box structure which serves as a control rod guide.

Figure 3:
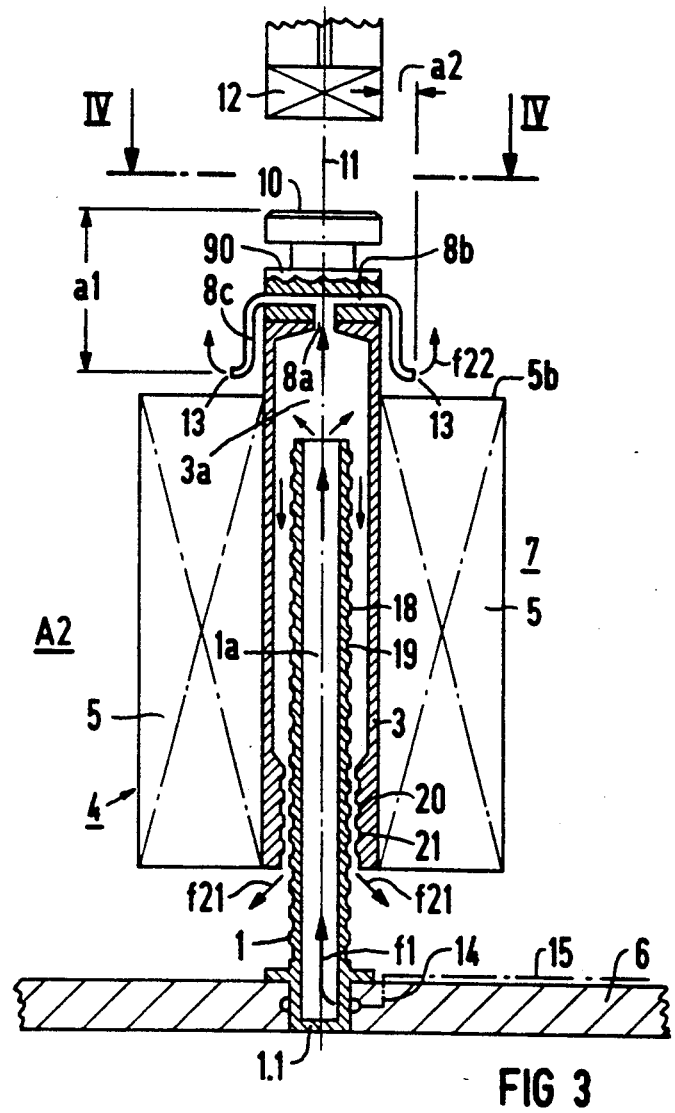
FIG. 3 is a view similar to FIG. 1 of a second embodiment of the invention, with a circular head plate with venting outlet pipes i.e. a drive with an circular head plate in which outlet pipes arranged in cross-like configuration.
Figure 4:
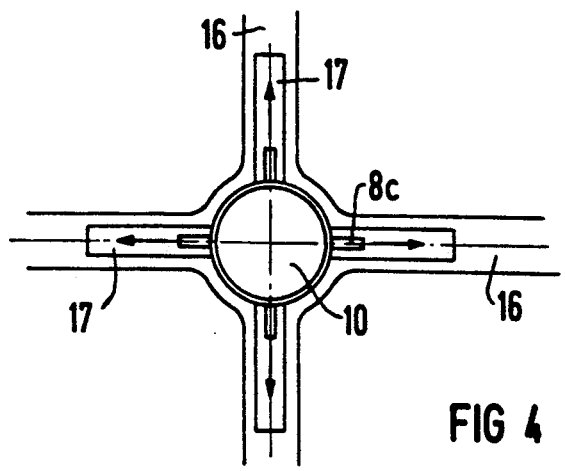
FIG. 4 is a view similar to FIG. 2 of the embodiment of FIG. 3.
Figure 5:
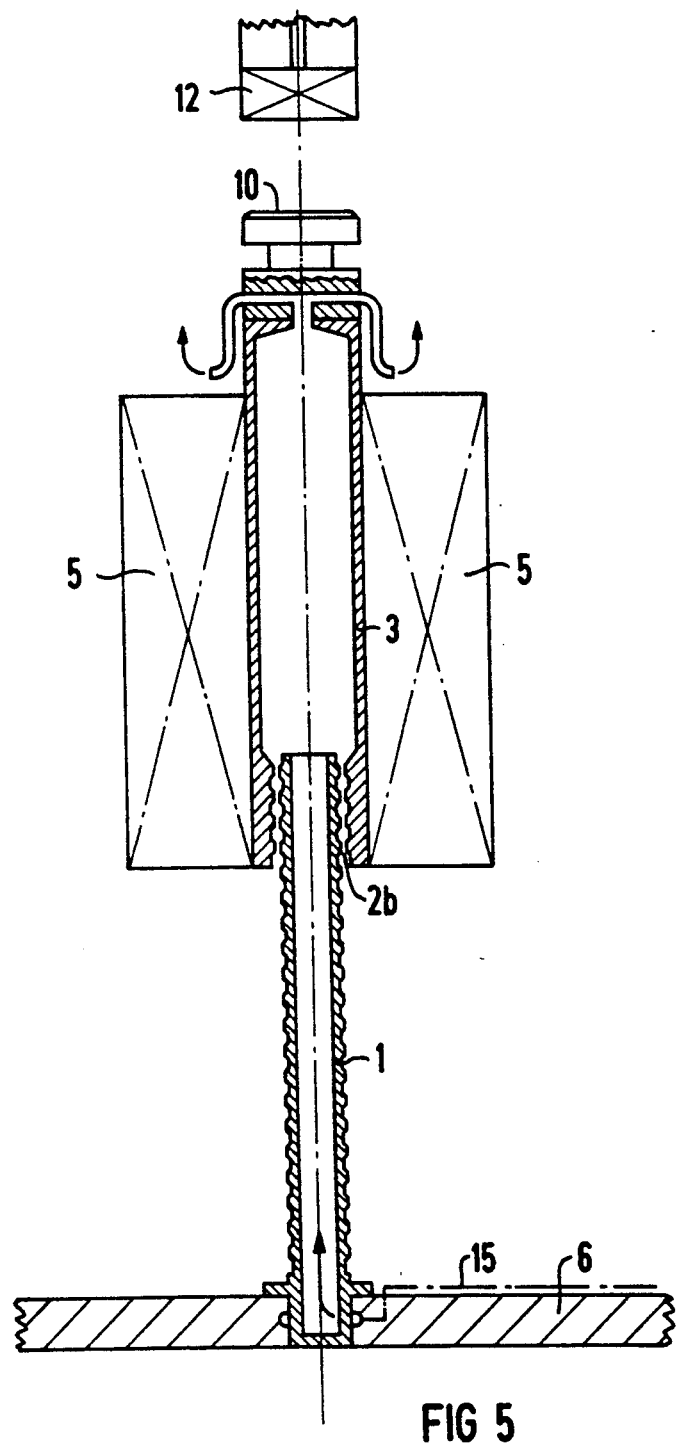
FIG. 5 is a side-elevational, cross-sectional view of the embodiment of FIG. 3, showing an upper-most position of the control element.

Referring now to FIGS. 3 to 5 for providing an additional explanation of the functionality of the inventive drive configuration, whereby identical parts in these FIGS. are also provided with the same reference numerals as in FIGS. 1 and 2. The embodiment according to FIGS. 3 to 5 differs from that of FIGS. 1 and 2 in that a head plate 90, whose diameter approximately corresponds to the hollow cylinder, is provided at the top of the hollow cylinder. The head plate 90 is provided with a channel configuration 8a, 8b which is T-shaped in an axial section. Outlet pipes 8c are inserted in the channel openings and are bent downwardly and outwardly, approximately in S-shape. The pipes 8c allow the partial venting flows f22 to exit from their outlet openings 13 in the region of the upper edges 5b of the absorber plates. The channel system 8a, 8b and including the outlet pipes 8c is also arranged in a cross-shaped plan-view, in correspondence with the cross-shaped gaps 16 for the absorber plates 5 (compare FIG. 4).

Working medium (reactor water) is pressed into the hollow piston 1 through a pump and a (non-illustrated) hydraulic control unit. According to arrows f1, the working medium flows through the hollow body 1 into the upper part of the hollow cylinder 3 (inner space 3a). A (smaller) portion flows through the channel system 8a, 8b and the outlet pipes 8c. Most of the working medium, however, is pressed through the gaps between the hollow piston 1 and the hollow cylinder 3; it emerges at the foot of the hollow cylinder 3. These pressure losses result in excess pressure in the upper part of the hollow cylinder 3 as compared to the pressure in the plenum 7. Accordingly, with sufficient pressure, a hovering or holding of the control rod 4 is effected. In dependence on the position of the protrusions 18, 21 and the recesses 19, 20, a variable flow cross section results, which makes it possible to hold the control rod 4 in stable positions through a great range of mass throughput. Increasing or decreasing the hydraulic control flow attains a new positional level of the control rod 4.

The hydraulic drive system as described is self-secured because, should the pump stop or the necessary working medium pressure cease for any reason, the drive system dives automatically into the core and assumes its shut-down position. FIG. 5 shows an upper control rod position as compared to FIG. 3.

Figure 6:
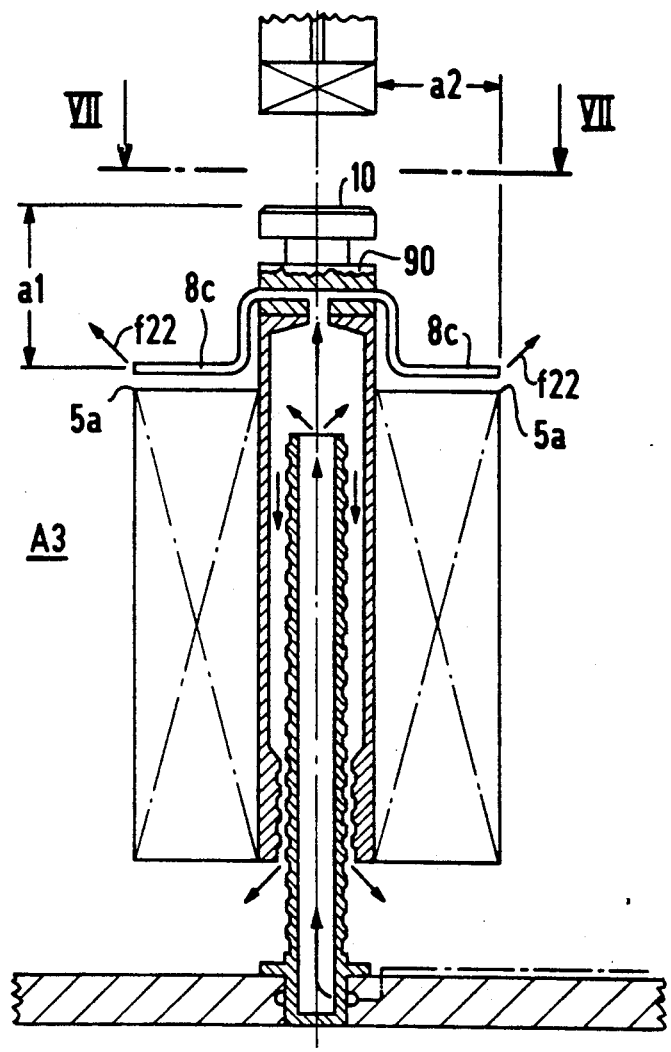
FIG. 6 is a view similar to FIG. 1 of a third embodiment of the invention, in which the outlet tubes are radially elongated as compared to the embodiment of FIGS. 3 to 5.
Figure 7:
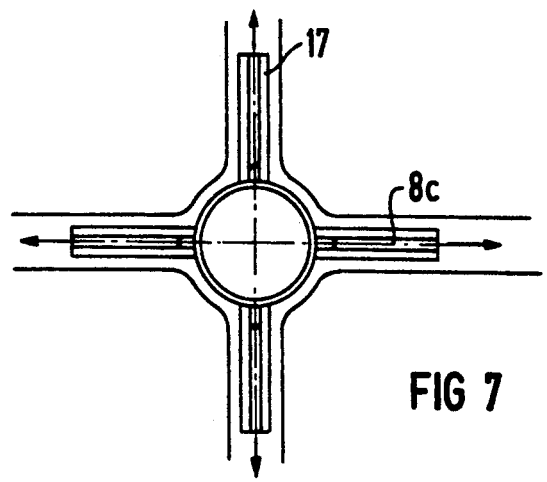
FIG. 7 is the view similar to FIG. 4 of the embodiment of FIG. 6, defined by the section plane VII—VII of FIG. 6.

The embodiment of a hydraulic drive A3 according to FIGS. 6 and 7 differs from that of FIGS. 3 to 5 in that the outlet pipes 8c are extended to the region of the absorber plate tips 5a. Accordingly, the partial currents f22 emanate from the openings of the outlet pipes 8c at locations which lie in the region of or outside the absorber plate tips 5a.

In all three embodiments with the drives A1 to A3 it is assured by the enlarged axial and/or radial distances a1 and a2 that the partial venting flows f22 flow into the reactor plenum 7 at a security distance far from the ultrasonic measurement path 12-10, which distance is great enough so that the ultrasonic distance measurement is virtually unaffected by the density fluctuations in the working fluid. In the case of a hydraulic pressure in the hollow piston 1 which is greater than that in the reactor plenum 7 by at least about 1.5 to 3 bar, the downwardly bent outlet pipes 8c have no disadvantageous effect, because possibly existing air bubbles are necessarily dragged along.

We claim:

1. A hydraulic control rod drive for a nuclear reactor, with a piston/cylinder drive associated with a control rod and a reactor plenum enclosing the drive, comprising:
   a) two hollow bodies together forming a cylinder-piston unit and defining an inner space;
   b) means for supplying a working fluid through one of said hollow bodies;
   c) a first one of said hollow bodies being stationary and a second one of said hollow bodies being disposed coaxially with respect to said first hollow body and defining an annular gap therebetween so as to allow axial movement of said second hollow body; said second hollow body forming a carrier body for control elements of a control rod;
   d) said first hollow body having a lower region with a working fluid supply channel formed therein;
   e) means for lifting, lowering or suspending said second hollow body by feeding working fluid through said supply channel to said inner space and removing the working fluid from said inner space via a throttle passage;
   f) a positional measurement system for said second hollow body with an ultrasonic measurement path, including an ultrasound reflector disposed at an upper end of said second hollow body, and an ultrasonic transducer rigidly mounted above and remote from said ultrasound reflector; and
   g) means for venting said inner space, said venting means being in the form of a venting channel configuration disposed at an upper end in said second hollow body, said venting channel configuration having channels opening into the reactor plenum at a given distance from said ultrasonic measurement path, so as not to cause density fluctuations in the working fluid disposed in said ultrasonic measurement path.

2. The hydraulic control rod drive according to claim 1, wherein said throttle passage is formed by said annular gap.

3. The control rod drive according to claim 1, wherein said first hollow body is a hollow piston being open at an upper end thereof, said second hollow body is a hollow cylinder coaxially surrounding and covering said first hollow body and defining said annular gap therebetween, and whereby an axial position of said hollow cylinder relative to said hollow piston is determined by an amount of working fluid supplied through said hollow piston into said hollow cylinder.

4. The control rod drive according to claim 3, including a cross-shaped attachment part having a central channel part and cross legs extending away from said central channel part, said cross-shaped attachment part being disposed on the upper end of said hollow cylinder and having said venting channel configuration formed therein, said venting channel configuration including radial channels originating from said central channel part, communicating with an interior of said hollow cylinder, extending through said cross legs, and opening into the reactor plenum.

5. The control rod drive according to claim 4, wherein the control elements of the control rod are absorber plates disposed around said hollow cylinder in a cross-shaped configuration and having distal edges facing away from said hollow cylinder, said radial channels opening into the reactor plenum approximately in the region of said distal edges.

6. The control rod drive according to claim 3, wherein the control elements of the control rod are embodied as cross-shaped absorber plates extending radially from said hollow cylinder, including a head plate disposed on said hollow cylinder and having said venting channel configuration formed therein, said head plate having a diameter approximately corresponding to a diameter of said hollow cylinder, said venting channel configuration including channels being T-shaped as seen in axial section, and including outlet pipes having outlet openings and communicating with said channels, said outlet openings being disposed at a given distance from said ultrasonic measurement path.

7. The control rod drive according to claim 1, wherein said venting means are a venting channel configuration disposed at an upper end in said second hollow body, said venting channel configuration including venting channels extending at an angle of between 5° and 10° relative to the horizontal.

8. The control rod drive according to claim 1, including first annular protrusions and recesses formed about the outer circumference of said first hollow body, second annular protrusions and recesses formed on an inner surface of said second hollow body, said first and second annular protrusions and recesses defining annular gaps therebetween, said annular gaps forming the throttle passage for the working fluid emanating from the inner space of said first and second hollow bodies.

9. In a nulcear reactor having a fuel assembly with a control rod and a reactor plenum enclosing the fuel assembly, a hydraulic control rod drive, comprising:
   a movable cylinder having control rod elements disposed thereon;
   a stationary piston rigidly mounted in the fuel assembly, said piston having a bottom, an open top, and an axial opening formed therein for allowing communication between said bottom and said open top;
   said cylinder being disposed coaxially around said piston and defining a gap therebetween so as to allow axial movement of said cylinder;
   means for supplying a working fluid to said piston for lifting, lowering or suspending said cylinder;
   means for measuring a vertical displacement of said cylinder; and
   means for venting said gap between said piston and said cylinder.

10. The control rod drive according to claim 9, wherein said measuring means include an ultrasonic reflector disposed on said cylinder, and an ultrasonic transducer rigidly mounted above said cylinder in alignment with a longitudinal axis of said cylinder.

11. The control rod drive according to claim 9, wherein said venting means are in the form of a venting channel formed in an upper end of said cylinder for allowing working fluid with gas bubbles to escape from said cylinder.

* * * * *